United States Patent
Webb et al.

[15] 3,635,004
[45] Jan. 18, 1972

[54] ORCHARD MACHINE

[72] Inventors: Byron K. Webb; Clarence E. Hood, both of Clemson, S.C.

[73] Assignee: Research Corporaton, New York, N.Y.

[22] Filed: Mar. 2, 1970

[21] Appl. No.: 15,585

[52] U.S. Cl..............................56/235, 56/328 TS, 56/329, 239/77, 239/191
[51] Int. Cl........................A01d 55/18, A01g 19/06
[58] Field of Search..............56/328, 329, 328 TS, 330, 235; 239/191, 77, 78; 296/26, 27

[56] References Cited

UNITED STATES PATENTS

| | | | |
|---|---|---|---|
| 3,245,211 | 4/1966 | Weggandt et al. | 56/330 |
| 2,798,354 | 7/1957 | O'Brien et al. | 56/235 |
| 3,473,310 | 10/1969 | Christianson | 56/329 |
| 3,127,036 | 3/1964 | Cunningham et al. | 56/330 |
| 3,541,773 | 11/1970 | Cate | 56/329 |
| 3,531,925 | 10/1970 | Vines et al. | 56/329 |

Primary Examiner—Louis G. Mancene
Assistant Examiner—J. N. Eskovitz
Attorney—Stowell & Stowell

[57] ABSTRACT

A general purpose, self-propelled, orchard machine has a rectangular vertical frame mounted on driven and steerable wheels with the machine straddling fruit trees and supporting an operator who, through a single hydraulic system, controls the movements of the machine and the operation of the arrangements carried thereby. The frame has collapsible front and rear sections whereby the width thereof is reduced for travel on public roadways and also has opposing side sections that support laterally inwardly and outwardly movable fruit catching sections disposed adjacent the bottom of the machine which carries an overlying tree shaker. Such catching sections have caster wheels and are moved apart as the machine straddles a tree and brought together to encircle the tree and catch the falling fruit which is transported rearwardly and then laterally of the machine by conveyors associated with the catching sections. In spraying, trimming or otherwise treating fruit trees, the catching sections are removed and the frame sections carry appropriate spraying, cutting and other arrangements.

12 Claims, 28 Drawing Figures

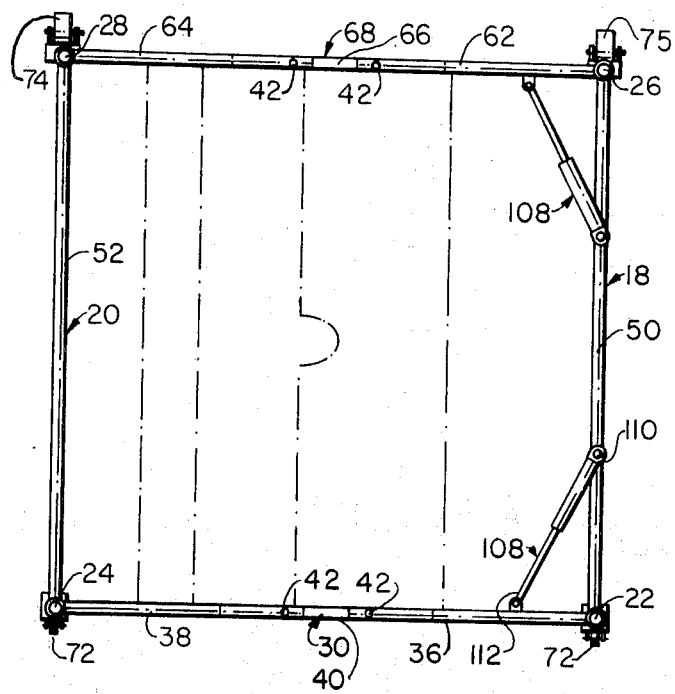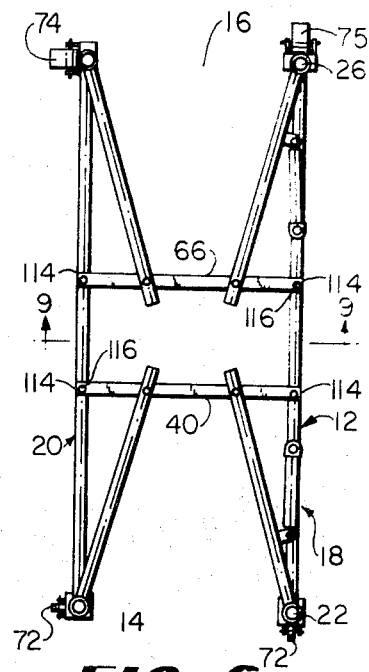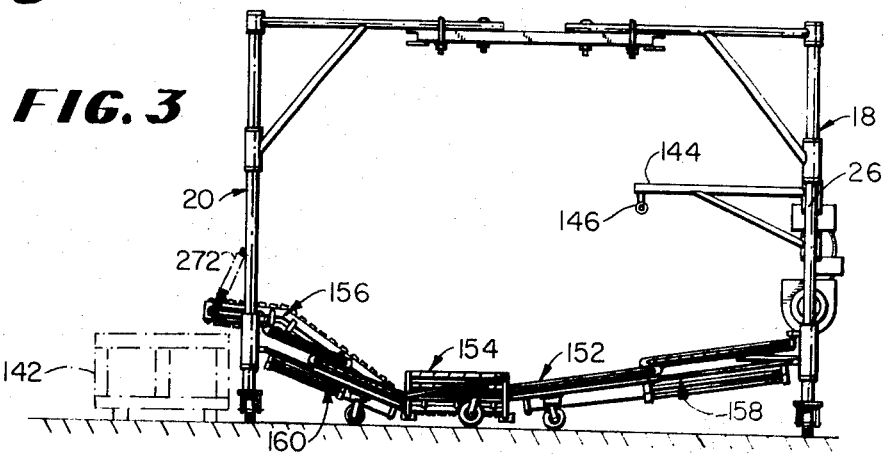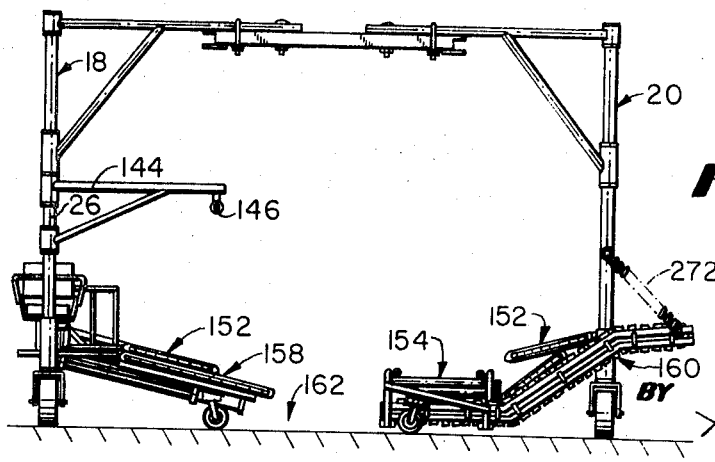

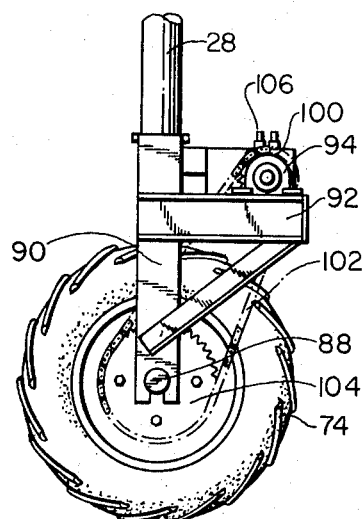
FIG. 10
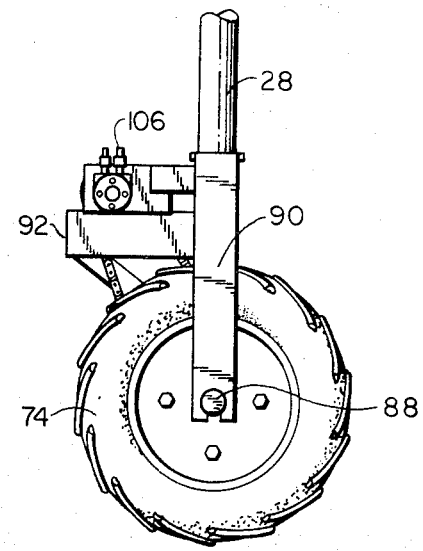
FIG. 11
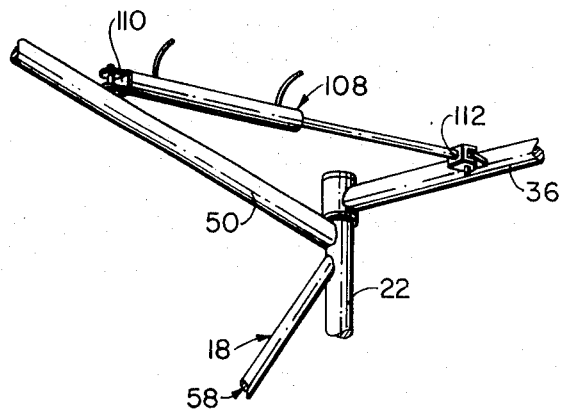
FIG. 7
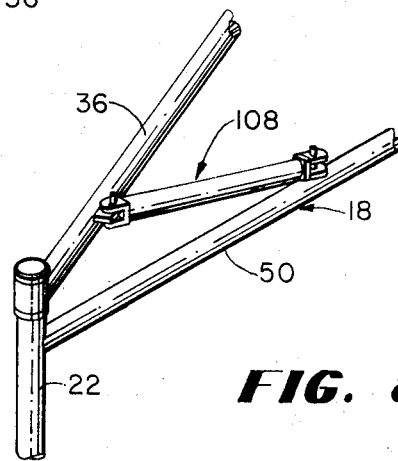
FIG. 8
FIG. 9
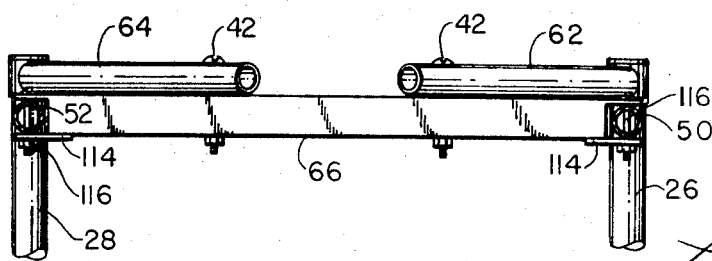
INVENTORS
BYRON K. WEBB
CLARENCE E. HOOD
*Stowell & Stowell*
ATTORNEYS INVENTORS
BYRON K. WEBB
CLARENCE E. HOOD
BY *Stowell & Stowell*
ATTORNEYS

INVENTORS
BYRON K. WEBB
CLARENCE E. HOOD

*Stowell & Stowell*
ATTORNEYS

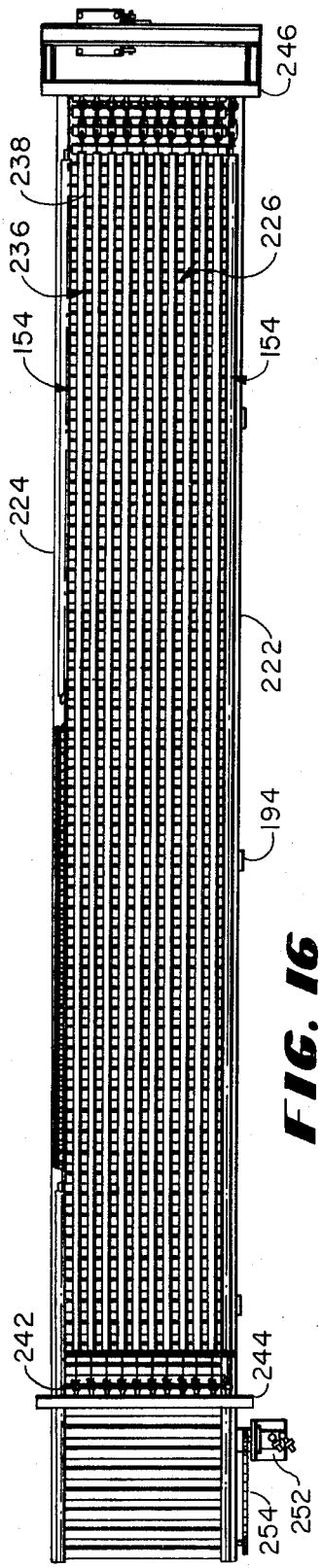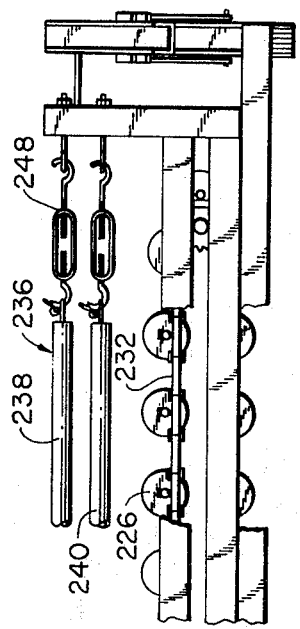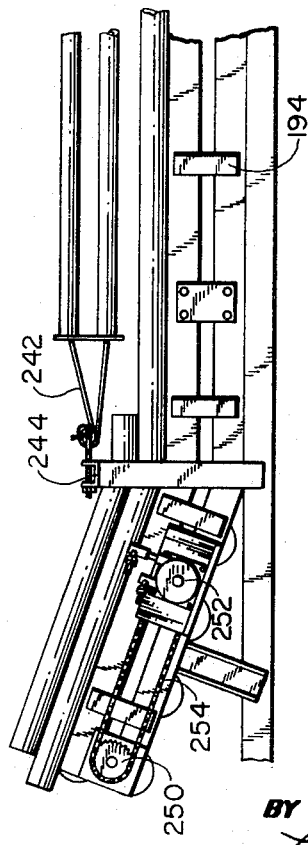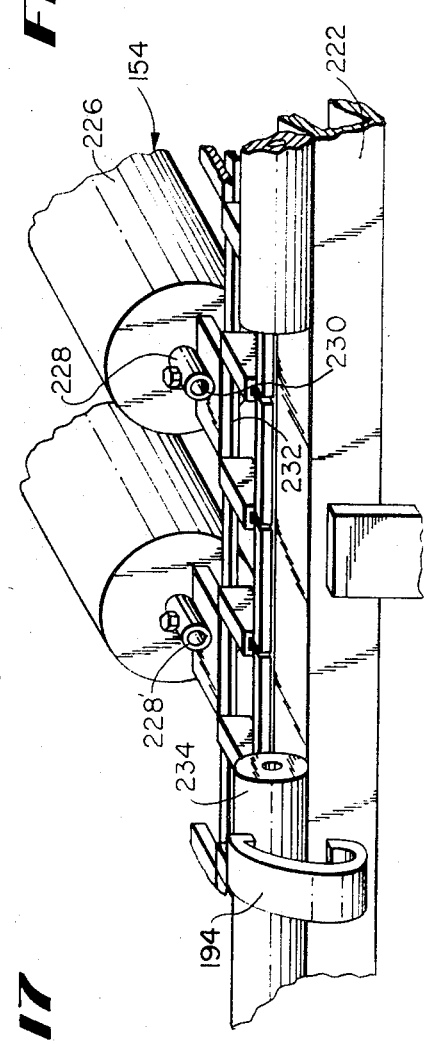

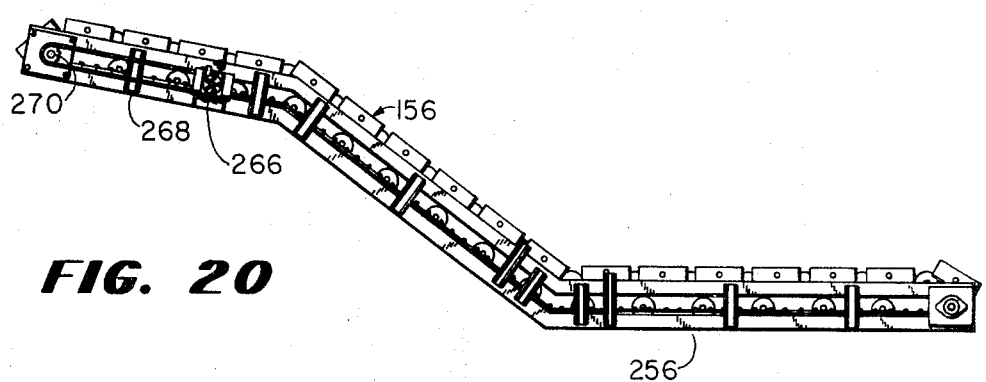
FIG. 20
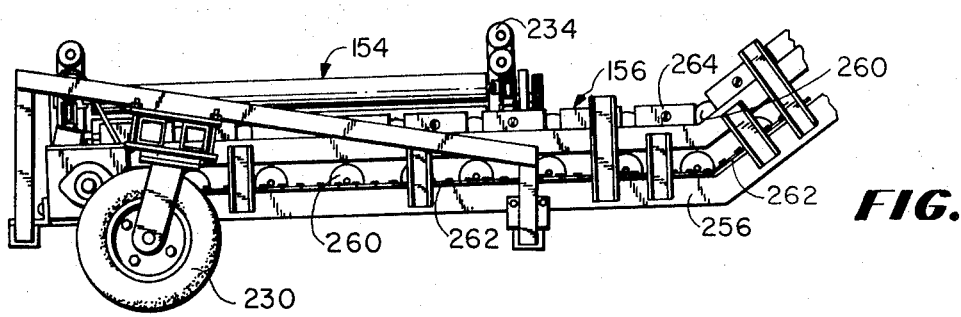
FIG. 21
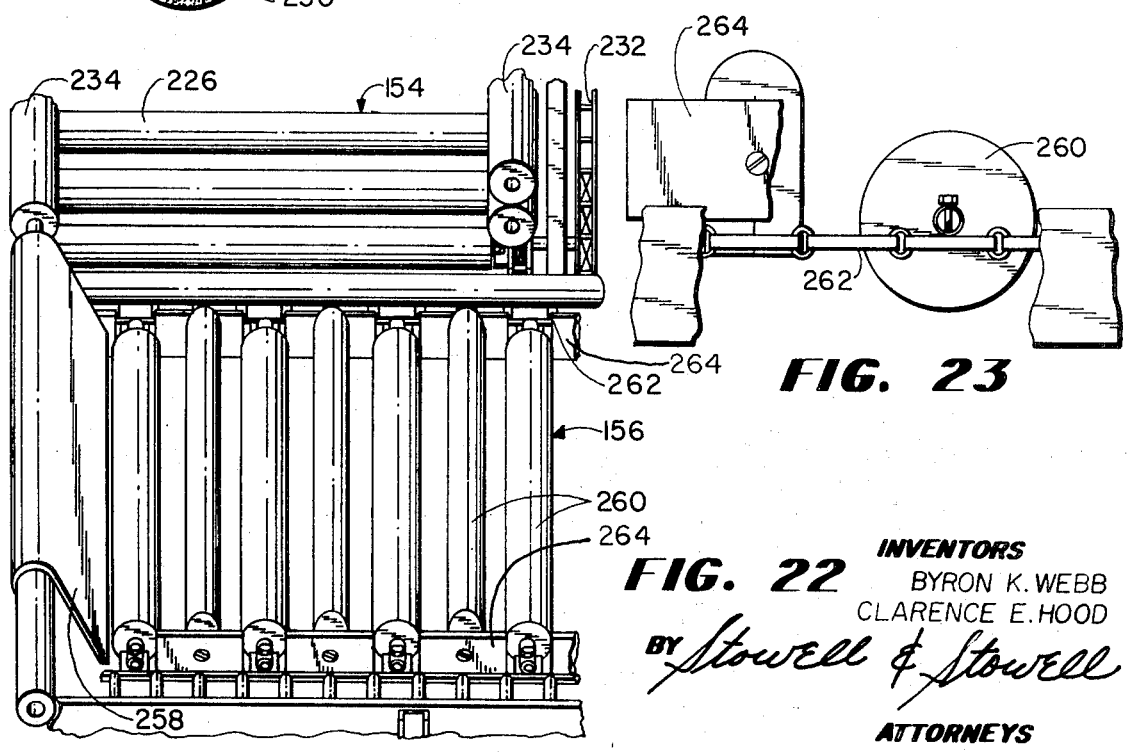
FIG. 22
FIG. 23
INVENTORS
BYRON K. WEBB
CLARENCE E. HOOD
BY Stowell & Stowell
ATTORNEYS

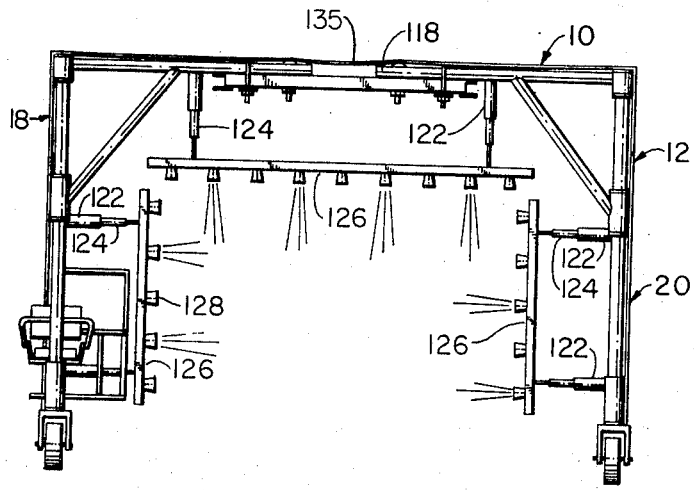
FIG. 25
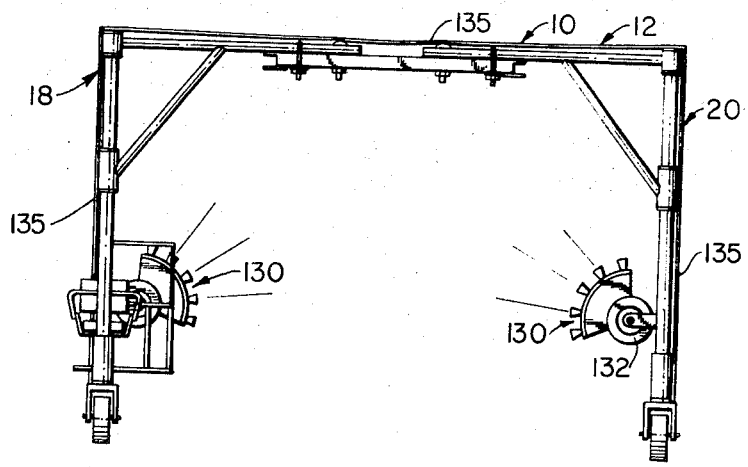
FIG. 26
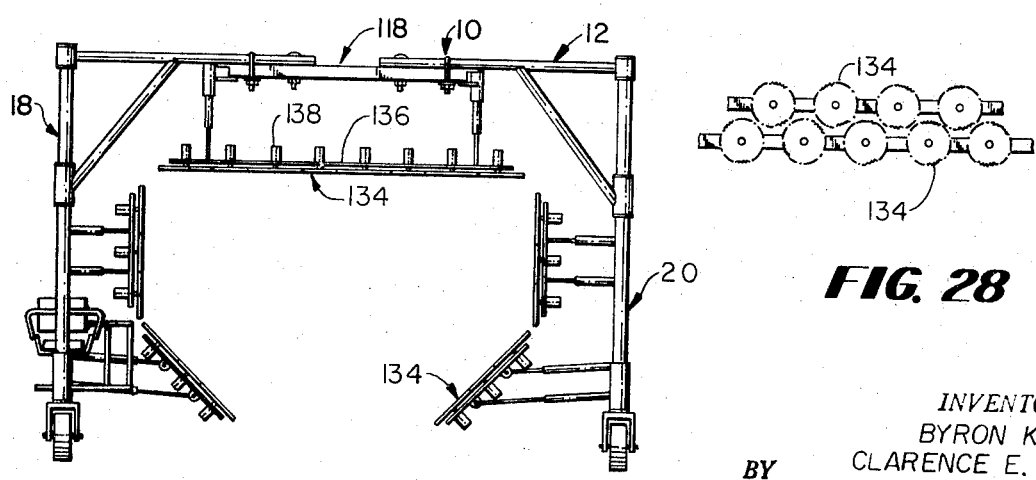
FIG. 27
FIG. 28
INVENTOR.
BYRON K. WEBB
CLARENCE E. HOOD
BY
Stowell & Stowell

ORCHARD MACHINE

BACKGROUND OF THE INVENTION

1. Field of the Invention

The present invention generally appertains to new and novel improvements in agricultural machinery and apparatus and more particularly relates to a new and novel general purpose or universal machine operatively devoted to the harvesting, thinning, spraying, pruning and otherwise harvesting and cultivation of fruit trees.

2. Description of the Prior Art

Even at the present time, fruit, such as peaches and apples, is still being harvested by hand, and this is in spite of and in the light of the existence in the prior art of mechanical harvesters. Such mechanical harvesters have not proven commercially feasible and practically satisfactory because they lack orchard mobility, require trailer transportation from one orchard to another, require more than a minimum of two operators, are very complicated from a construction and operation standpoint, and lack any adaptability to terrain conditions.

Therefore, due to the absence of a practical mechanical fruit harvester, peaches and apples, for example, are still being harvested by hand, Thus, harvest costs remain higher than any other costs of production. In addition, the cost of manual picking labor is increasing every year while the labor supply is continually dwindling and management problems are increasing. Many growers will be forced out of business unless the harvesting operation can be successfully mechanized. Commensurate with this need is the requirement that such mechanical harvester have an adaptability for other orchard tasks since the cost thereof should be spread over more than just utilization during the harvesting season. The latter is also in line with the inability to obtain and the high cost of manual labor needed for spraying, pruning and performing other tasks attendant with the maintenance and operation of an orchard.

SUMMARY OF THE INVENTION

The present invention presents a self-propelled machine which carries an operator who, through a single hydraulic system, can control the drive and steering wheels that support the machine and also control the operation of the various arrangements carried by the frame of the machine. The machine is run by the single operator in consort with a companion who assists in the shaking of the trees and the conversion of the machine for different orchard tasks and for self-propelled movement along public roadways from one orchard to another.

Basically, the machine has a rectangular vertical frame which includes open front, rear and opposing side sections. The front corners are mounted on caster wheels while the rear corners are mounted on hydraulically driven and steered wheels that provide the drive and maneuverability for the machine. The frame is rather high so that the machine straddles the fruit trees in operating on an over-the-row principle. However, the front and rear sections are formed in connection with the side sections so that they can be collapsed whereby the width of the frame is reduced. By effecting such reduction of width of the machine, the same may be self-propelled along public roadways. Thus, in one exemplary form, the frame is 18 feet wide, 18 feet long an has a 12-foot clearance in its movement over the rows of fruit trees. When the machine is collapsed for transporting movement on public roadways, the frame has an 8-foot width.

With the over-the-row design, the machine of the present invention is a single harvesting unit that is operated by one person though a companion acts to shake the trees. Only a single power unit is required so as to lead to simplicity in design and ease of operation, as well as compactness and reduction of costs in building. The machine possesses an increased orchard mobility and adaptability to orchard terrain and has the utmost of simplicity of operator control.

One of the rear corner posts of the frame has a boom pivotally mounted thereon for horizontal swinging movement and the boom supports a hydraulic shaker which can be moved in and out of a tree very readily and easily by the second workman, while the hydraulic operation of the shaker is under the control of the machine operator from his position at the rear end to one side of the machine.

Underlying the boom and disposed between the side sections of the frame is a fruit catching arrangement which includes two complemental catch sections that are carried by the side sections of the frame and are movable laterally of the frame inwardly and outwardly under hydraulic control from the machine operator. The catch sections extend from the front to the rear of the frame and are provided on their undersides with caster wheel arrangements that follow the contour of the orchard with the sections being mounted so as to compensate therefor. The catch sections are movable under the control of the machine operator from fully closed positions wherein their inner side edges are complemental and provide an opening that effectively surrounds the trunk of a tree to retracted positions wherein both sections are spaced apart at their inner longitudinal edges so as to provide about a 3-foot wide path that extends the full length of the machine. In such latter position, the machine can be moved from tree to tree along a row, while, when the sections are closed, the tree is encircled and then the shaker is utilized to cause the fruit to fall onto the catch sections.

Operatively associated with the catch sections which incline inwardly toward their inner edges are a longitudinal conveyor that carries the fallen fruit from the catch sections to the rear of the machine and a lateral conveyor cooperating with the longitudinal conveyor to transport the fruit into a collection bin disposed alongside the rear side of the machine. Both of the conveyors are hydraulically operated and are formed so that damage to the conveyed fruit is prevented. In this respect, the catch sections are formed so that the falling fruit is not harmed and is not bounced back and so that the catch sections are not damaged by contact with the tree limbs.

Accordingly, a primary object of the present invention is to provide a versatile machine which can be used for harvesting fruit from trees in a novel manner and which also can be used as a general purpose orchard machine and which is extremely simple and compact in its construction and operation so that it can be inexpensively operated and maintained while being operated by a single operator.

Another important object of the present invention is to provide a single machine that has a single power system for effecting self-propulsion and steering under a single operator's control so that the machine has increased orchard mobility and which can be easily reduced in width for similar mobility and ease of travel on public roadways.

Another important object of the present invention is to provide a fruit catching arrangement that is carried by the frame of the machine and which is movable laterally of the frame in two sections so as to provide a longitudinal pathway for the over-the-row, straddling movement of the machine and so as in its inwardly movement to encircle a tree and collect all of the fruit in an undamaged manner with the fruit catching arrangement also having longitudinal and lateral conveyor means for transporting the fallen fruit without injury or damage from their fallen positions to a collection bin at the rear of the machine.

BRIEF DESCRIPTION OF THE DRAWINGS

FIG. 3 is a front-elevational view of the harvester machine of FIG. 1 and showing the relation between the longitudinal collector conveyor, the lateral discharge conveyor and a collection bin at the rear side of the frame of the machine.

FIG. 4 is a rear-elevational view of the harvester machine of FIG. 1 with the sections of the catching bed being shown in their spread apart or outer lateral positions so as to establish the longitudinal travel pathway.

FIG. 5 is a fragmentary top plan view of the frame of FIGS. 1–4 with the catching bed and conveyors only diagrammatically shown.

FIG. 6 is a top plan view of the frame in a collapsed position with the catching bed and conveyors removed and the machine being of a reduced width for travel on a public roadway.

FIG. 7 is a fragmentary perspective view of one of the front corners of the frame and shows one of the hydraulic rams used in collapsing the frame from the position of FIG. 5 to the position of FIG. 6.

FIG. 8 is a view similar to FIG. 7 but showing the ram and the frame in its collapsed position, as shown in FIG. 6.

FIG. 9 is a vertical cross-sectional view taken substantially on line 9—9 of FIG. 6.

FIG. 10 is an enlarged elevational view of one side of one of the rear driving and steering wheels for the machine.

FIG. 11 is an elevational view of the opposite side of such wheel.

FIG. 16 is an enlarged top plan view of the longitudinally extending collector conveyor.

FIG. 17 is an enlarged fragmentary side-elevational view of one end of the conveyor structure, as shown in FIG. 16, and illustrating in greater detail the drive mechanism for the conveyor and a fruit decelerator means associated with the conveyor to prevent damage to the fruit collected thereon and conveyed thereby longitudinally of the harvester machine towards the rear of the machine.

FIG. 18 is an enlarged fragmentary side-elevational view of the opposite end of such collector conveyor structure.

FIG. 19 is an enlarged and detailed showing of a portion of such collector conveyor structure so as to illustrate two flights thereof and the manner of attaching same to the conveyor drive chain and to illustrate the bumper and skid means associated therewith.

FIG. 20 is a side-elevational view of the lateral discharge conveyor, per se.

FIG. 21 is a view of the opposite side of the discharge conveyor shown in FIG. 20.

FIG. 22 is an enlarged fragmentary view taken substantially on line 22—22 of FIG. 1.

FIG. 23 is an enlarged fragmentary showing of a portion of the conveyor assembly to illustrate the mounting arrangement for the flights.

FIG. 25 is a rear-elevational view of the machine in its use as a means for spraying the fruit trees.

FIG. 26 is a rear-elevational view of the machine showing a modified spraying arrangement.

FIG. 27 is a rear-elevational view of the machine showing the same with pruning arrangements on the frame thereof.

FIG. 28 is a fragmentary front-elevational view of the tree pruning shown generally in FIG. 27.

DESCRIPTION OF THE PREFERRED EMBODIMENTS

Figure 1:
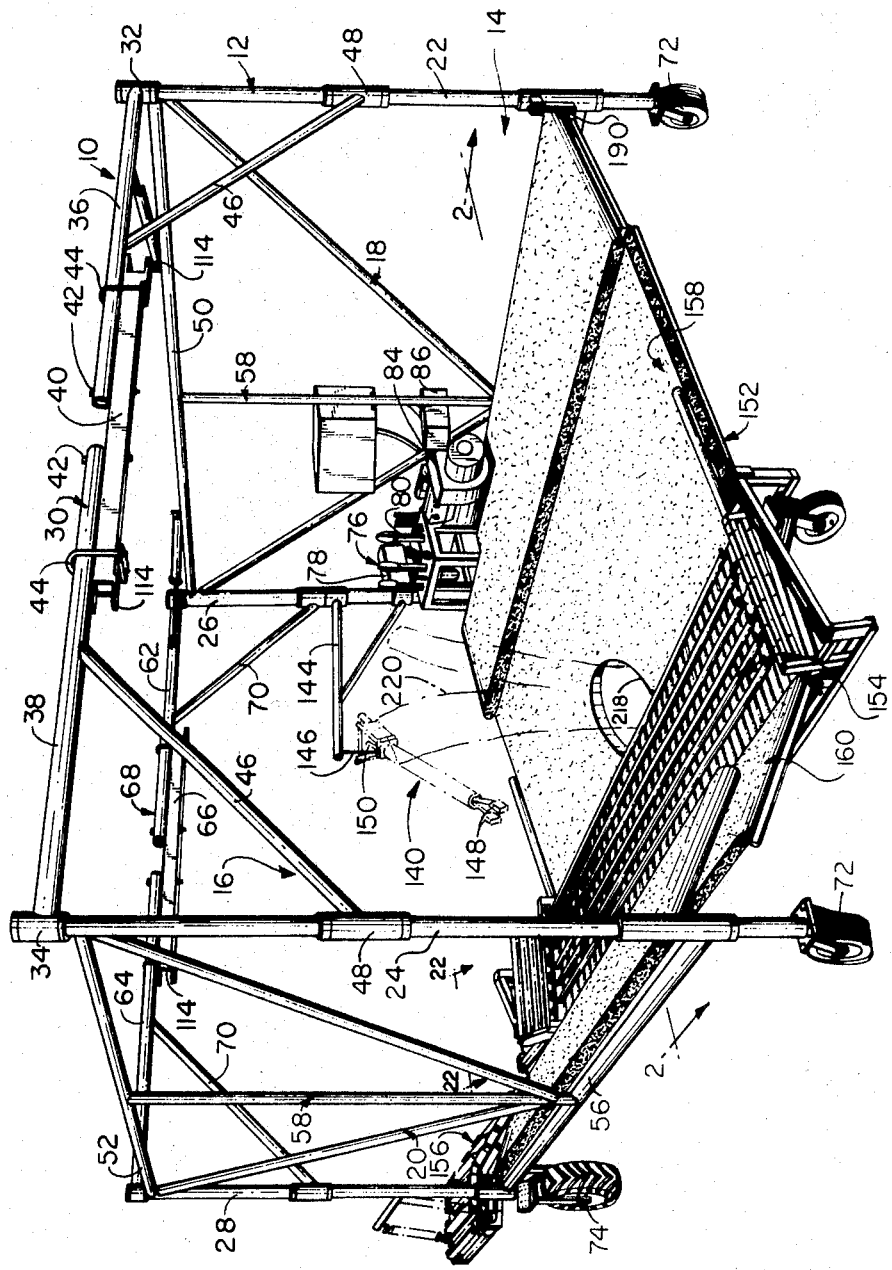
FIG. 1 is a perspective view of the machine of the present invention showing the same in use as a harvester and, for this purpose, illustrating the same in harvesting relation with a tree that is only fragmentarily shown.

Referring now more particularly to the accompanying drawings, and initially to FIGS. 1–9, the machine 10 includes a basic rectangular vertical frame 12 which has an open front 14, an open rear 16 and opposing sides 18 and 20. The frame is substantially composed of vertical corner posts 22, 24, 26 and 28 with posts 22 and 24 being front posts and the posts 26 and 28 being posts.

The front 14 is essentially defined by the transversely spaced-apart front corner posts 22 and 24 that are held in their secured laterally spaced-apart vertical relation by being joined at their upper ends by a collapsible crossbar arrangement 30. Such arrangement 30 includes sleeves 32 and 34 rotatably mounted on the upper ends of the posts 22 and 24 and carrying horizontal rods 36 and 38 which, in their normal relation extend inwardly towards each other and terminate in spaced-apart relation, as shown in FIGS. 1 and 5. In such spaced relationship, the outer aligned ends of the rods are connected by a bridge bar 40. The outer ends of the rods 36 and 38 have vertical holes that accommodate bolts 42 which are inserted through aligned openings in the bridge bar and secured by fastening nuts. U-bolts 44 are employed to secure the end portions of the axially aligned and spaced-apart rods 36 and 38 to the bridge bar 40 so as to lock the bridge bar in fixed spanning and connecting relation with such rods. The horizontally disposed rods 36 and 38 are provided with fixed angular support rods 46 that have their lower ends 48 rotatably sleeved on the posts 22 and 24.

The front corner posts are securely fixed in spaced-apart relation with the rear corner posts 26 and 28 by longitudinally extending, horizontal connector rods 50 and 52 adjacent their upper ends and by similar connector rods 54 and 56 adjacent their lower ends. The sides 18 and 20 have vertical reinforcing "A" frames 58 that extend fixedly between the upper and the lower connector rods.

The rear 16 is constructed and formed identical to the front 14 so that the corner posts 26 and 28 have swivelly mounted thereto horizontal rods 62 and 64, with such rods being connected in their normal inwardly facing and axially spaced-apart and aligned relation by a bridge bar 66 which is attached thereto and secured in the same way as the bridge bar 40. Such constitutes the same type of collapsible crossbar arrangement 68 for the rear corner posts as provided by the crossbar arrangement 30 for the front corner posts. The rods 62 and 64 are further rotatably connected to the posts 26 and 28 by angular reinforcing rods 70 similar to the front rods 46.

The lower ends of the front corner posts 22 and 24 are supported by ground-engaging free swiveling caster wheels 72 that have their upstanding support shafts freely journaled on the lower ends of the front corner posts for a free full 360° movement. The lower ends of the rear corner posts 26 and 28 are mounted on and supported by drive wheels 74 and 75, as shown more particularly in FIGS. 10–12 and as will be described.

An operator's station 76 is arranged in an offset manner at the rear end of what may be considered as the outer side 18 or the left rear of the machine 10. The operator's station includes a seat 78 positioned behind a control console 80 which contains the hydraulic power unit and controls of the single hydraulic system 82 shown schematically in FIG. 24 and to be described. Also, at the operator's station a conventional internal combustion engine 84 is mounted in association with a fuel tank 86.

Figure 12:
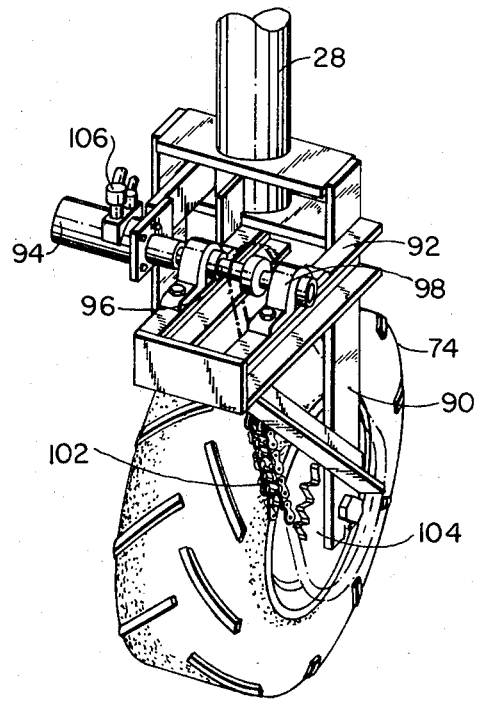
FIG. 12 is a perspective showing of such drive wheel, as shown in FIGS. 10 and 11.

As shown in FIGS. 10–12, each drive wheel has its axle 88 mounted in the depending legs of a U-shaped frame 90. The top or web portion 92 of such wheel support frame is coupled by bolt and mounting flange arrangements to the lower end of one of the rear corner posts 26 and 28. A hydraulic drive motor 94 is mounted on the top portion 92 and has its drive shaft 96 journaled in bearings 98 and carrying a drive sprocket 100. The sprocket 100 is drivingly and lockingly connected by a chain 102 to a driven sprocket 104 on the wheel 88. The motor 94 is provided with hydraulic couplings 106 that are connected by hydraulic lines to the control console 80 for operation of the drive wheels 74 and 75, as will be described.

Through the hydraulic system 82 the rear wheels can be driven forward or in reverse or can be locked against any movement. In the latter regard, the mobility of the machine is predicated upon such steering by driving.

Figure 2:
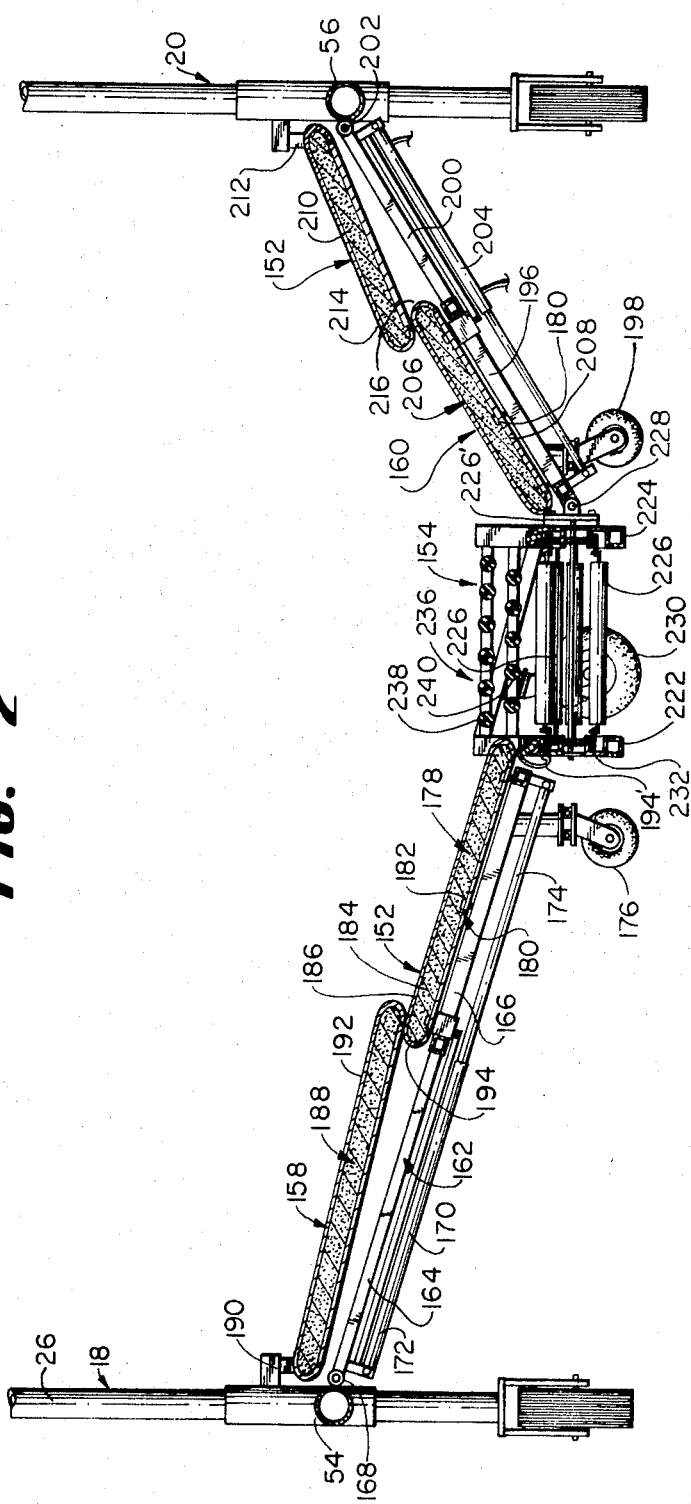
FIG. 2 is a transverse vertical sectional view taken substantially on line 2—2 of FIG. 1.

One important feature of the machine 10 of the present invention resides in its unique construction for over-the-row orchard travel and for equally mobile travel on public roadways. In order to allow the machine to travel on public roadways it is necessary that the width thereof be reduced. Normally, as shown in FIGS. 1, 2 and 5, the machine is 18 feet wide, 18 feet long and has a 12-foot clearance. The frame is constructed so that the width of the machine can be reduced to about 8 feet for public road travel.

In accomplishing such collapsing of the frame 12, the right rear drive wheel 74 is first rotated 90° from its normal straight ahead position. Thus, it is changed from the position shown in FIG. 5 to that shown in FIG. 6. This is accomplished by removing one of the fastening bolts so that the wheel 74 can be turned and secured in a position perpendicular to the normal direction travel of the machine. The U-bolts 44 on the front and rear bridge bars 40 and 66 are removed, thus leaving such bridge bars pinned loosely to their rods by the bolts 42. In effect, the front and rear crossbar assemblies then become three-link pivotal mechanisms with the ends of the rods 36 and 38 and 62 and 64 being free to pivot about the corner posts and about the bridge bars.

As shown more clearly in FIGS. 7 and 8, collapsing cylinders 108 are pivotally mounted at their cylinder ends 110 and at their outer piston rod ends 112 between the upper connector rod 50 for the left or outer side 18 of the frame 12 and the associated front and rear post carried rods 36 and 62. When such normally extended cylinders, as shown in FIG. 7, are retracted while simultaneously driving the right rear wheel 74, the entire right-hand side 20 of the frame 12 will move toward the left-hand side 18, with the right front caster wheel swiveling into proper position, as shown in FIG. 6.

As such occurs, the front and rear bridge bars or box beams 40 and 66 move toward the center of the frame, as shown in FIG. 6, and form the cross members when the machine 10 is fully collapsed. Such bars or beams 40 and 66 are provided with clevis ends 114 that fit around the middle portions of the upper connector rods 50 and 52. The flanges of such clevis ends 114 are apertured to complement vertical openings in such middle portions of the rods so as to receive fastening bolts 116.

The machine 10 is designed and constructed as a general purpose orchard machine so that while it has its primary utility as a harvester, as shown generally in FIG. 1, it also has equal utility for accomplishing other tasks in connection with the care and cultivation of fruit trees in an orchard. This is especially true because of the structurally "over-the-row" frame 12 with its associated self-propulsion and extreme mobility and the simple control of the machine, in its entire operations, by a single operator.

Thus, as shown in FIG. 25, the machine 10 is used for spraying fruit trees as it moves thereover. The frame 12 has its sides 18 and 20 and a top structure 118 provided with adjustable support brackets 122–124 that support spray pipes 126. A plastic curtain 135 covers the top and sides of the frame 12. The pipes are fed from a source of spray fluid under pressure carried by the frame and have nozzles 128. With such arrangement, the sides and tops of the trees are completely sprayed as the frame moves over the trees.

As shown in FIG. 26, high-volume oscillating blowers 130 are mounted on the sides 18 and 20 of the frame 12 and driven in a sweeping up and down fashion by associated hydraulic drive motors 132 with the blowers being in communication with a pressure source of spray fluid or powder carried by the frame 12. A plastic curtain 135 completely covers the top and sides of the frame 12.

The machine 10 also functions as a pruner, as shown in FIGS. 27 and 28. Thus the sides 18 and 20 and the top structure 118 hydraulically carry a gang of rotary saws 134 with the carrying arrangement being such as to control the positioning of the saws relative to the sides and top of the trees. The rotary saws are arranged in an alternating nested pattern, as shown in FIG. 28, with the carrier heads 136 being arranged in various adjustable angular relative placement, as shown in FIG. 27. The drive motors 138 will be driven from the hydraulic control system of the machine 10.

The machine 10, in its use as a harvester, only requires the services of two workmen, neither of whom must be of high skill. One of the workmen sits on the seat 78 and operates the machine while the other workman walks behind the machine and performs the task of operating the shaker 140, shown diagrammatically in FIG. 1 and schematically in FIG. 24.

The shaker 140 is supported by a swinging boom 144 which is swivelly mounted on the left rear corner post 26 and which has a suspended cable clamp means 146 that bodily supports the shaker. The shaker includes a hydraulic clamping cylinder 148 to engage a tree limb or trunk and a shaker motor 150 for vibrating or shaking such engaged tree limb or trunk. Thus, the shaker 140 is suspended by the cable means 146 from the boom 144 which freely pivots about the left rear corner post 26 of the frame 12. This permits the second workman to move the shaker into and out from a tree very easily and readily. With the shaker clamped to a tree limb and the shaker motor in operation, fruit will readily and quickly fall from the tree onto a fruit-catching means 152 that lies below the shaker and extends almost the full length and width of the machine and occupies the space between the front, rear and opposing sides 18 and 20 of the frame in operative conjunction and association with a longitudinal collector conveyor means 154 and a lateral discharge conveyor means 156 disposed at the rear of the machine for delivering fruit from the machine into the collection bin 142, as will be described.

The fruit-catching means 152, as shown in FIGS. 1–4 and 13–15, includes cooperating catch sections 158 and 160. The catch section 158 is carried by the left side 18 of the frame while the catch section 160 is carried by the right side of the frame, as shown in FIG. 2, the longitudinal collection conveyor means is disposed at the meeting inboard edges of such sections to transport the fruit rearwardly to the laterally disposed discharge conveyor means 156 that delivers the fruit to the collection bin 142 which may be carried by the frame 12 or mounted on wheels, as shown, for movement alongside of and with the machine 10.

The catch sections 158 and 160, as shown in greater detail in FIGS. 2 and 13–15, are very similar in construction and operation in that they each consist of two telescopically arranged sections, an inner ground wheel supported one and an outer side frame hinged one, with the sections being moved by hydraulic cylinder means laterally of the frame 12 from the closed position of FIGS. 2 and 3 to the open position of FIG. 4. In the latter position, a longitudinal pathway 162 of about 3-feet width is created whereby the machine 10 can move along and over a row of trees.

Figure 14:
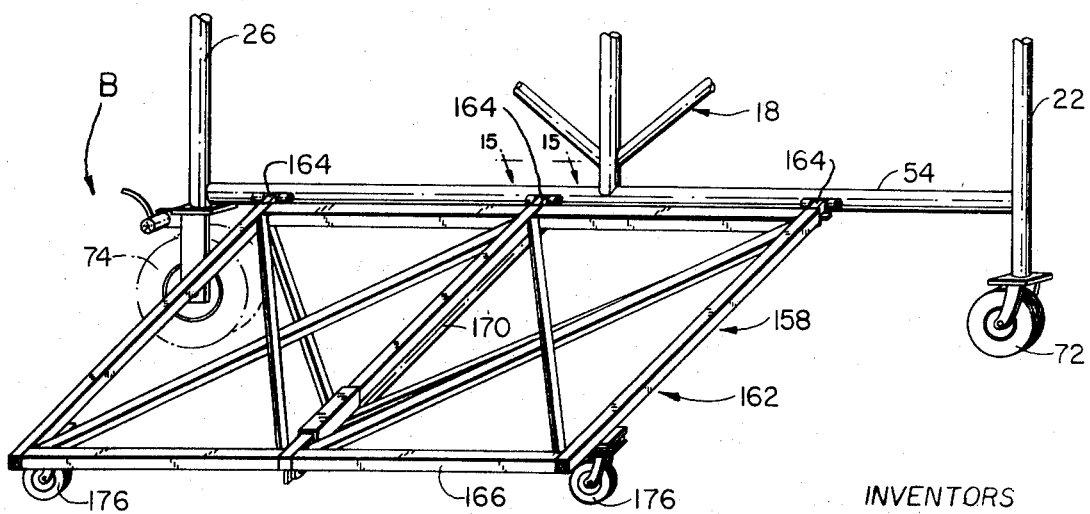
FIG. 14 is a perspective view of the frame for the other bottom catch section and showing such frame in retracted position and in fragmentary structural connection with one of the sides of the machine frame.

The catch section 158 includes a telescopic framework 162, as shown in FIG. 14, with such framework having an outer hinged portion 164 and an inner ground wheel supported portion 166. The outer framework section is hinged by hinge pin means 168 to the lower longitudinal connector bar or rod 54, as shown in FIG. 2 and in detail in FIG. 15. The outer framework section slides into the inner framework section and relative thereto in a telescopic manner with the telescopic movement of the inner and outer framework sections being controlled by a hydraulic cylinder 170 that has its closed cylinder end 172 attached to the outer side of the outer framework section and the outer end of its piston rod 174 attached to the outer side of the inner framework section.

The inner framework section 166 is supported on its underside by ground-engaging free swivelly caster wheels 176 and supports on its upper side or face a catching surface 178 which is fastened thereto by fasteners 180. The catching surface 178 includes a perforated masonite or the like rather rigid but perforated support member 182 that sits on its secured to the framework. A layer of polyurethane foam or similar multicellular material 184 overlies the top of the member 182 and is encased by a covering 186 of nylon-reinforced plastic to protect it from low-hanging tree limbs and from ultraviolet radiation from the sun. The construction of the catching surface allows air to be expelled from the same when fruit drops thereon so as to delimit the bounce back of the fruit. In effect a rather effective cushioning and deadening result is realized with little rebound action by the fruit.

The outer framework section 164 has a catching surface 188, constructed identical to the catching surface 178, overlying it, as shown in FIG. 2, with the catching surface 188 being hinged at the ends of its outer side edge, as at 190, to the front and rear corner posts 22 and 26 of the frame 12. The inner side edge 192 of the catching surface 188 freely overlies the outer side edge 194 of the fixed catching surface 178 which has its inner side edge adapted to strike and ride over vertical skids 194' on the adjoining side edge of the longitudinal collector conveyor means 154, as shown in FIG. 2.

Figure 13:
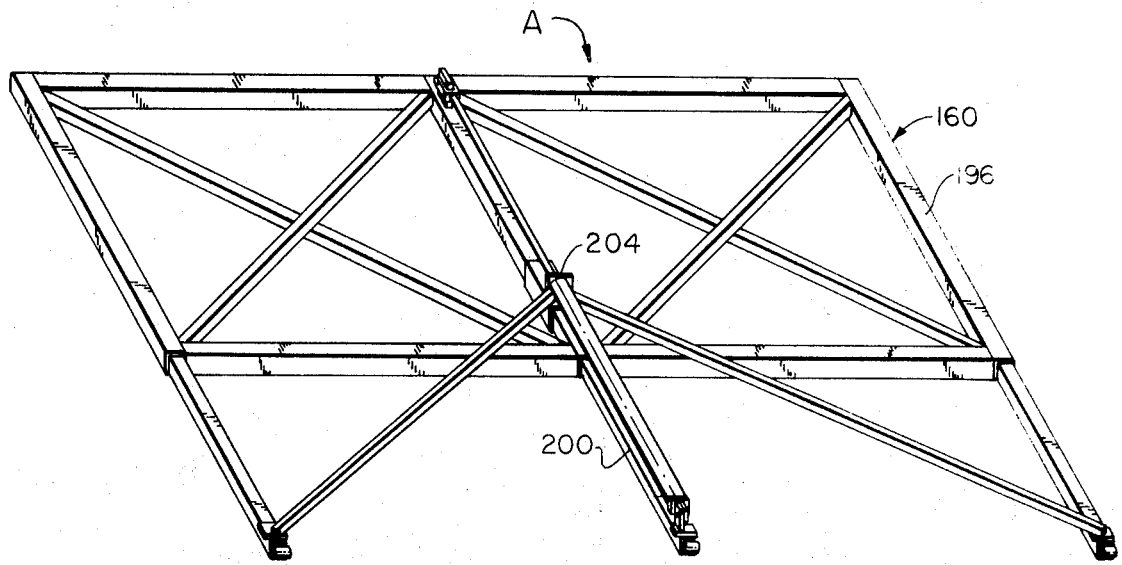
FIG. 13 is a perspective view of the frame for one of the bottom catch sections and showing such frame in an extended or outermost position.
Figure 15:
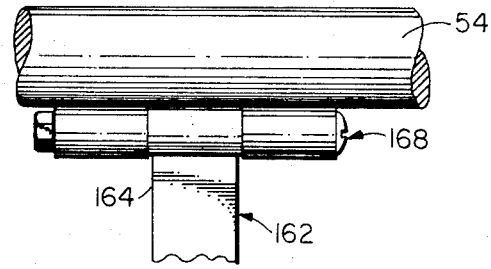
FIG. 15 is a fragmentary cross-sectional view taken substantially on line 15—15 of FIG. 14.

The catch section 160 also includes an inner framework section 196 that is supported by free swiveling caster wheels 198 and an outer framework section 200 that is hinged, as at 202, to the side rod or bar 56 of the frame side 20. A cylinder 204, as shown in FIGS. 2 and 13, controls the telescopic spreading and retracting movements of the two framework sections 196 and 200 which have their side bars in sliding telescopic relation, as shown in FIG. 13. The hydraulic cylinder 204 is connected at its closed end and at the outer end of the piston rod between the inner and outer framework sections, as shown in FIG. 13. A catching surface 206, formed identical to the catching surfaces 178 and 188, is fixedly superimposed on the inner framework section 196 by fasteners 180, while an identical catching surface 210 is hinged at its ends by hinge means 212 carried by the front and rear corner posts 24 and 28 for the side 20 and overlies the outer framework section 200. The inner side edge 214 of the outer catching surface 210 freely overlies the outer side edge 216 of the fixed inner catching surface 206, as shown in FIG. 2.

The longitudinal collector conveyor means 154 is carried by the catch section 160, as will be described, while the inner side edge of the catching surface 178 on the inner framework section 166 of the catch section 158 is formed substantially midway of its front and rear ends, as shown in FIG. 1, with a padded and resilient arcuate cutout portion 218 that is adapted to encircle a tree truck 220, as shown in FIG. 1. The inner side edge of the catching surface 178 overlies the skids 194 and leads directly to the collector conveyor means 154. In this respect, both of the catch sections 158 and 160 are inclined inwardly and downwardly toward the opposite side edges of the longitudinally disposed collector conveyor means 154.

The longitudinal collector conveyor means 154 includes laterally spaced and interconnected, vertically disposed and longitudinally extending side frames 222 and 224. The side frame 224 has frame mounts 226' provided therealong and to which the inner side edge of the framework section 196 of the catch section 160 is pivotally attached in a supporting fashion, as at 228 in FIG. 2, so as to support the conveyor frame in conjunction with the ground-engaging wheel 230 for the lateral conveyor means 156, as shown also in FIG. 2.

Between the side frames 222 and 224, conveying rollers 226 are arranged transversely in spaced-apart fashion and in upper and lower flights. The stub ends 228' of the rollers are attached, as at 230' in FIG. 19, to the upper and lower reaches of endless conveyor chains 232. Each of the rollers 226 consists of a round rubber or soft plastic covered aluminum tubing. Such covering is used to minimize fruit damage while the rod or roller-type construction permits and achieves separation of the fruit from leaves and other foreign material. The fruit is conveyed by the rollers in the upper flight to the rear of the machine while leaves and other debris filter through the upper flight of rollers and are carried by the lower flight to the front of the machine for free falling discharge therefrom.

Each side frame has longitudinally extending rubber bumpers 234 arranged therealong above the conveyor chains, as shown in FIG. 19, and leading to the upper flight of the crosswise rollers 226. Also, in this respect, due to the rapid accumulation of fruit on the collector conveyor 154, deceleration means 236 is necessary directly over the rollers of the conveyor to minimize fruit damage. Such deceleration means includes the provision of upper and lower layers 238 and 240 of round resilient tubing with the rear ends of such tubing being attached by plastic straps 242 to the support bar arrangement 244 on the conveyor frame. The front ends of the tubing are attached to a support bar arrangement 246 by plastic rope-carrying turnbuckles 248 for tension adjustment. Preferably, there is a 5-inch spacing between individual tubes of the decelerator tubing and a 3-inch spacing between the upper and the lower layers. The tubes of the lower layer are centered beneath the openings in the top layer.

The conveyor chains 232 are driven by a drive sprocket 250 which is powered through a chain drive 254 by a hydraulic motor 252.

It will be noted from FIG. 17 that the rear end portion of the longitudinal collector conveyor 154 is slightly elevated and that additional bumbers 234 are provided. Such elevated rear end portion delivers the fruit onto the lateral discharge conveyor means 156, as shown in FIGS. 20 and 21.

The lateral discharge conveyor 156 includes a frame 256 which is supported on its outer side (FIG. 20) by the free swiveling ground-engaging caster wheel 230, as shown in FIG. 2. The frame 256 is supported by the rear end portions of the side frames for the collector conveyor 154. At its inner end the lateral conveyor frame has a face plate 258 in front of which the conveyor flights turn. The conveyor 156 is composed of rubber or soft plastic covered rods 260 which are attached, as shown in FIG. 22, to the upper and lower reaches of the conveyor chains 262. The conveyor chains 262 carry end flaps 264 in the form of rubber belting in conjunction with the mounted ends of the covered rods or rollers 260. Such flaps constrain the fruit onto the conveyor 156 but move with the conveyor chains so that there is no relative movement between the restrains 264 and the fruit, thereby minimizing damage to the conveyed fruit.

The conveyor chains 262 are driven by a hydraulic motor 266 through a chain drive 268 to a drive sprocket 270.

As shown in FIGS. 3 and 4, a coil spring 272 is connected between the framework 256 of the lateral elevating conveyor and the corner post 28 of the frame 12 for the purpose of assisting in the support of the conveyor when the associated catching section 160 and the collector conveyor 154 are moved laterally to a retracted or outermost position, as shown in FIG. 4.

Figure 24:
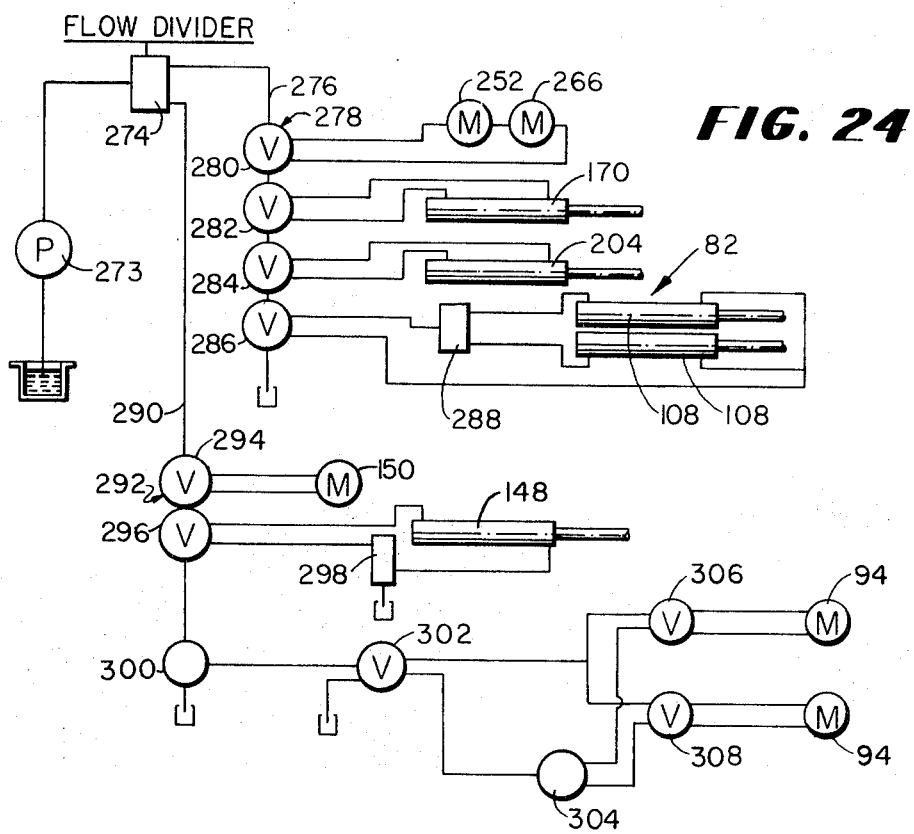
FIG. 24 is a schematic illustration of the single hydraulic system for controlling the movements of the machine and the operation of the various arrangements thereof.

The machine 10 is completely hydraulically operated and, in this respect, attention is directed to FIG. 24 in connection with the following description of the function of the system and the attendant operation of the machine 10 as a harvester. As aforestated and as can be seen from FIG. 1, the power unit, hydraulic pump 273 and all hydraulic controls are located at the left rear of the machine. With regard to FIG. 24, the output from the pump 273 is delivered to a priority flow divider 274. The flow from the priority line 276 goes to a four-spool stack valve 278 and is adjustable up to 7 g.p.m. Such adjustment provides speed control for the fruit conveyors 154 and 156. The first valve 280 of the stack 278 controls the motors 252 and 266 for the conveyors, such motors being connected in series. The valves 282 and 284 of the stack operate the cylinders 170 and 204 for moving each catch section 158 and 160 laterally inwardly and outwardly of the frame 12. The output from the last valve 286 of the stack goes to a 50/50 flow divider 288 and then to the two cylinders 108 which are employed for collapsing the frame 12.

The flow from the other line 290 of the flow divider 274 goes to a two-spool stack valve 292. This valve, which operates the shaker 140, is connected in series with the drive motors 94 for the drive wheels 74 since the shaker is never in operation while the machine is in motion or vice versa. Valve 294 of the two-spool stack 292 operates the motor 150 which provides the vibratory motion for the shaker 140. The output from the valve 296 goes to a pressure-reducing valve 298 which maintains a constant pressure in the clamping cylinder 148 of the shaker. This pressure is regulated to provide an adequate clamping force without excessive limb damage (usually set at 600 p.s.i.). The cylinder 148 operates a clamping means for the shaker with the clamping means engaging a tree limb or trunk.

When the shaker 140 is not in operation, the flow through the two-spool stack valve 292 goes to a bypass-and-restrictive flow regulator 300 which is the speed control for the drive wheel motors. The regulated flow from the regulator 300 goes to a four-way, three-position valve 302 which provides forward, stop and reverse drive to the wheels 74. When the valve 302 is in the forward position, the flow goes to a wide range, proportional flow divider 304 with variable proportion which serves as the steering control. Steering is accomplished by varying the flow to the drive motors of the two drive wheels with the steering flow divider 304. The entire flow can be directed to either wheel, or the flow can be divided between the wheels 74 in any proportion desired. The flow from the flow divider 304 to each of the drive motors for the wheels 74 passes through motion control and lock valves 306 and 308 in the line for each wheel motor to provide crossline relief protection, run-away protection (anticavitation) and dynamic breaking. The flow goes from the valves 306 and 308 to the motors 94.

From the foregoing it is believed that the operation of the many hydraulic controls by the single operator from his vantage point station 76 will be very clear and that such will also clarify the operation of the single hydraulic system. It can be appreciated that the harvester machine 10 will be easily moved steered along the rows of trees in an orchard with the frame 12 straddling the trees in an over-the-top manner. The shaking of the trees and catching of the falling fruit without damage and the conveying thereof to the collection bin is carried out very expeditiously with only the services of two relatively unskilled workmen being necessary.

Obviously, when the frame 12 is to be collapsed and the machine is functioning as a harvester, it is necessary to remove the fruit-catching sections and the associated conveyors but such can easily and readily be accomplished since in entails only the removal of a few fastening bolts or pins.

While the best known form of the present invention has been set forth in the foregoing, such is merely exemplary and, quite obviously, the "Abstract" is merely for a reader's convenience and has no restrictive means or significance, since the measure of the invention is set forth in the appended claims.

What is claimed is:

1. An orchard machine comprising a substantially rectangular vertical frame having an open front, open rear and opposing sides, said frame having vertical corner posts at the front and sides and at the rear and sides, wheels on the lower ends of the posts, certain of said wheels being driven and steerable so that the frame is self-propelled in a straddling fashion over rows of trees, an operator's station on one side of the frame, a single hydraulic control system including operation of the driven wheels, said system being controlled and operated by an operator at the operator's station, means operatively carried by the frame and disposed inwardly thereof and actuated by the hydraulic system for performing work on fruit trees as the frame straddingly moves thereover, said corner posts at the front and at the rear of the frame being only connected transversely of the frame at their upper ends by a collapsible pivotal cross-linkage, means for locking said linkage against movement so as to retain the sides in a wide-apart relation, said locking means when released permitting inward collapsing of the linkages and hydraulic collapsing cylinders forming a part of the hydraulic control system and connected between one side of the frame and the adjoining front and rear corner posts.

2. The invention of claim 1 and means for locking said cross-linkages to the sides adjacent the midportions thereof after collapsing of the frame so as to hold the sides in closer together relation.

3. The invention of claim 1 wherein said frame has a top structure and said work performing means includes blower means carried by the sides of the frame and facing inwardly, said blower means being vertically movable and a flexible cover enclosing the top structure and the sides so as to confine the blown material from the blowers onto frame enclosed trees.

4. The invention of claim 1 wherein said frame has a top structure and said work performing means includes pruner saws carried in gang fashion by the top structure and the sides of the frame and facing inwardly therefrom in selective angular interrelationship, said saws being rotary and having hydraulic drive motors forming a part of the hydraulic control system and said gangs being movable inwardly from the frame relative to frame enclosed trees.

5. The invention of claim 1 wherein said frame has a top structure and said work performing means includes spray means carried by the sides and the top structure, said spray means being adjustable inwardly from the frame toward frame enclosed trees.

6. An orchard machine comprising a substantially rectangular vertical frame having an open front, open rear and opposing sides, said frame having vertical corner posts at the front and sides and at the rear and sides, wheels on the lower ends of the posts, certain of said wheels being driven and steerable so that the frame is self-propelled in a straddling fashion over rows of trees, an operator's station on one side of the frame, a single hydraulic control system including operation of the driven wheels, said system being controlled and operated by an operator at the operator's station, means operatively carried by the frame and disposed inwardly thereof and actuated by the hydraulic system for performing work on fruit trees as the frame straddingly moves thereover, said corner posts at the front and at the rear of the frame being only connected transversely of the frame adjacent their upper ends by a collapsible pivotal cross-linkage for selectively retaining the sides in a wide-apart or close-together relation and hydraulic control cylinders forming a part of the hydraulic control system and connected between one side of the frame and the adjoining front and rear corner posts for controlling such lateral movement of the sides.

7. An orchard machine comprising a substantially rectangular vertical frame having an open front, open rear and opposing sides, said frame having vertical corner posts at the front and sides and at the rear and sides, wheels on the lower ends of the posts, certain of said wheels being driven and steerable so that the frame is self-propelled in a straddling fashion over rows of trees, an operator's station at one side of the frame, a single hydraulic control system including operation of the driven wheels, said system being controlled and operated by an operator at the operator's station, means operatively carried by the frame and disposed inwardly thereof and actuated by the hydraulic system for performing work on fruit trees as the frame straddingly moves thereover, said last-named means including means carried by one of the corner posts for shaking fruit trees, fruit-catching means forming a bottom wall for the frame between the sides and the front and the rear on which the falling fruit falls, a longitudinal collector conveyor operatively associated with said fruit-catching means for transporting the fallen fruit rearwardly of the frame, a lateral discharge conveyor operatively associated with said collector conveyor for moving the fruit laterally off the machine, said fruit-catching means including a pair of telescopic sections hingedly carried by the sides and haVing complemental inner longitudinal edge portions, said collector conveyor being carried by the edge portion of one of said sections and means for extending and retracting said sections so as to provide in their retracted positions a longitudinal pathway for the frame to move over and along trees and to provide in their extended positions a tree-encircling arrangement, the telescopic sections each including outer portions and inner portions, said outer portions being hinged to the sides of the frame and free swiveling ground-engaging caster wheels supporting the inner portions.

8. The invention of claim 7 and including hydraulic cylinders connected between the inner and outer portions so as to spread them apart and move them closer together, said hydraulic cylinders forming a part of the single hydraulic system.

9. The invention of claim 7 wherein said inner portions have fruit-catching surfaces fixedly superimposed thereon, said catching surfaces including perforated substantially rigid members, multicellular layers overlying said members and a flexible covering for the layers.

10. The invention of claim 9 wherein said outer portions have similar catching surfaces overlying them, said catching surfaces being hingedly connected to the sides and having inner side edges in oversliding engagement with the outer side edges of the catching surfaces on the inner portions.

11. An orchard machine comprising a substantially rectangular vertical frame having an open front, open rear and opposing sides, said frame having vertical corner posts at the front and sides and at the rear and sides, wheels on the lower ends of the posts, certain of said wheels being driven and steerable so that the frame is self-propelled in a straddling fashion over rows of trees, an operator's station on one side of the frame, a single hydraulic control system including operation of the driven wheels, said system being controlled and operated by an operator at the operator's station, means operatively carried by the frame and disposed inwardly thereof and actuated by the hydraulic system for performing work on fruit trees as the frame straddingly moves thereover, said last-named means including means carried by one of the corner posts for shaking fruit trees, fruit-catching means forming a bottom wall for the frame between the sides and the front and the rear on which the falling fruit falls, a longitudinal collector conveyor operatively associated with said fruit-catching means for transporting the fallen fruit rearwardly of the frame, a lateral discharge conveyor operatively associated with said collector conveyor for moving the fruit laterally off the machine, said fruit-catching means including a pair of telescopic sections hingedly carried by the sides and having complemental inner longitudinal edge portions, said collector conveyor being carried by the edge portion of one of said sections, means for extending and retracting said sections so as to provide in their retracted positions a longitudinal pathway for the frame to move over and along trees and to provide in their extended positions a tree-encircling arrangement, said collector conveyor including opposing side frames, resiliently covered rollers arranged transversely between the side frames, endless conveyor chains to which the rollers are attached in forming upper and lower flights with the upper flight moving rearwardly with the fruit thereon and the lower flight moving forwardly of the machine, a hydraulic motor forming part of the single hydraulic system for actuating the conveyor chains and deceleration means overlying the upper flight of rollers.

12. The invention of claim 11 wherein said deceleration means includes elongated resilient strips longitudinally overlying the upper flight of rollers in upper and lower staggered layers and tension adjustment means therefor.

* * * * *